United States Patent
Bojjireddy et al.

(10) Patent No.: US 10,812,276 B2
(45) Date of Patent: *Oct. 20, 2020

(54) SECURE TRUST BASED DISTRIBUTION OF DIGITAL CERTIFICATES

(71) Applicant: International Business Machines Corporation, Armonk, NY (US)

(72) Inventors: Karunakar Bojjireddy, Apex, NC (US); Sreekanth Ramakrishna Iyer, Bangalore (IN); Sudheesh S. Kairali, Kozhikode (IN); Vijay Kalangumvathakkal, Pathanamthitta (IN); Nataraj Nagaratnam, Cary, NC (US); Gal Shachor, Shefayim (IL)

(73) Assignee: International Business Machines Corporation, Armonk, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/904,278

(22) Filed: Feb. 23, 2018

(65) Prior Publication Data

US 2019/0268166 A1    Aug. 29, 2019

(51) Int. Cl.
*H04L 9/32* (2006.01)
*H04L 9/08* (2006.01)

(52) U.S. Cl.
CPC ............ *H04L 9/3268* (2013.01); *H04L 9/083* (2013.01); *H04L 9/3271* (2013.01)

(58) Field of Classification Search
CPC ...... H04L 9/3268; H04L 9/083; H04L 9/3271
See application file for complete search history.

(56) References Cited

U.S. PATENT DOCUMENTS

| 8,635,447 B1* | 1/2014 | Joyce | H04L 63/0823 713/156 |
| 9,716,595 B1 | 7/2017 | Kravitz et al. | |
| 2005/0071630 A1* | 3/2005 | Thornton | H04L 63/0823 713/156 |
| 2005/0076198 A1* | 4/2005 | Skomra | H04L 9/321 713/156 |

(Continued)

FOREIGN PATENT DOCUMENTS

WO    2015148884 A1    10/2015

OTHER PUBLICATIONS

Matsumoto, Stephanos, Pawel Szalachowski, and Adrian Perrig. "Deployment challenges in log-based PKI enhancements." Proceedings of the Eighth European Workshop on System Security. ACM, 2015. (Year: 2015).*

(Continued)

*Primary Examiner* — Jung W Kim
*Assistant Examiner* — Sameera Wickramsuriya
(74) *Attorney, Agent, or Firm* — Yee & Associates, P.C.

(57) ABSTRACT

A system and non-transitory computer program product for distributing digital certificates. A request for a digital certificate is received from a requesting system. A deployment challenge is sent to the trust agent running on the requesting system. A response to the deployment challenge is received from the trust agent running on the requesting system. The response to the deployment challenge is evaluated to determine whether the response is correct. The digital certificate is distributed to the requesting system in response to a determination that the response to the deployment challenge is correct.

10 Claims, 6 Drawing Sheets

(56) References Cited

U.S. PATENT DOCUMENTS

| | | | | |
|---|---|---|---|---|
| 2006/0143442 | A1* | 6/2006 | Smith | H04L 63/0823 713/156 |
| 2012/0137129 | A1* | 5/2012 | Busser | G06F 21/57 713/156 |
| 2012/0179907 | A1* | 7/2012 | Byrd | H04L 9/3268 713/156 |
| 2013/0311771 | A1* | 11/2013 | Hoggan | H04L 9/3268 713/156 |
| 2014/0108649 | A1* | 4/2014 | Barton | G06F 9/45533 709/224 |
| 2014/0281503 | A1* | 9/2014 | Mills | H04L 9/3263 713/157 |
| 2015/0271154 | A1* | 9/2015 | Ronca | H04L 63/107 713/168 |
| 2015/0271157 | A1* | 9/2015 | Ronca | H04L 9/0819 713/168 |
| 2015/0281189 | A1 | 10/2015 | Nayshtut et al. | |
| 2016/0088026 | A1* | 3/2016 | Mohamad Abdul | G06F 8/60 726/1 |
| 2016/0301695 | A1 | 10/2016 | Trivelpiece et al. | |
| 2016/0373252 | A1 | 12/2016 | Goldstein | |
| 2019/0372785 | A1 | 12/2019 | Bojjireddy et al. | |

OTHER PUBLICATIONS

Djordjevic, Ivan, and Chris Phillips. "Certificate-based distributed firewalls for secure e-commerce transactions." Journal—Institution of British Telecommunications Engineers 2.3 (2001): 14-19. (Year: 2001).*

"How to manage a web servers SSL private key protection (password vs. no password)?", 2 pages, accessed Feb. 23, 2018, https://serverfault.com/questions/25450/how-to-manage-a-web-servers-ssl-private-key-protection-password-vs-no-password.

"Are passwords stored in memory safe?", 7 pages, accessed Feb. 23, 2018, https://security.stackexchange.com/questions/29019/are-passwords-stored-in-memory-safe.

"Ngx.ssl—Lua API for controlling NGINX downstream SSL handshakes," 9 pages, accessed Feb. 23, 2018, https://github.com/openresty/lua-resty-core/blob/master/lib/ngx/ssl.md.

List of IBM Patents or Patent Applications Treated as Related, dated May 18, 2020, 2 pages.

Office Action dated Jan. 30, 2020, regarding U.S. Appl. No. 16/539,196, 33 pages.

Notice of Allowance dated Jun. 19, 2020, regarding U.S. Appl. No. 16/539,196, 14 pages.

* cited by examiner

SECURE TRUST BASED DISTRIBUTION OF DIGITAL CERTIFICATES

BACKGROUND INFORMATION

1. Field

The present disclosure relates generally to a system for distributing digital certificates and public keys in a public key infrastructure.

2. Background

Transport Layer Security (TLS) and its predecessor, Secure Sockets Layer (SSL), both frequently referred to as "SSL", are cryptographic protocols that provide communications security over a computer network. Websites are able to use TLS/SSL to secure all communications between their servers and web browsers. A prominent use of TLS is for securing World Wide Web traffic between a website and a web browser encoded with the HTTP protocol. This use of TLS to secure HTTP traffic constitutes the HTTPS protocol. HTTPS provides for the authentication of a website and an associated web server with which one is communicating, which protects against man-in-the-middle attacks. The main motivation for HTTPS is authentication of the visited website and protection of the privacy and integrity of the exchanged data. A TLS termination proxy (or SSL termination proxy) is a proxy server that is used to handle incoming TLS connections, and decrypt the TLS messages. TLS termination proxies, like a web server or reverse proxy, are used to reduce the load on the main servers by offloading the cryptographic processing. To prepare a web server or reverse proxy to accept HTTPS connections, an administrator must create a public key certificate for the web server. This certificate must be signed by a trusted certificate authority for the web browser to accept it without warning. The authority certifies that the certificate holder is the operator of the web server that presents it. Web browsers are generally distributed with a list of signing certificates of major certificate authorities so that the web browsers can verify certificates signed by the certificate authorities.

Typically, a Certificate Signing Request, CSR, is created and a certificate is ordered from the certificate authority. The certificate, along with the .key file generated when creating the CSR, needs to be copied to the server or container running the reverse proxy in a particular file location. This file location is configured in the reverse proxy. The proxy then uses the configuration information, reads the file and key, and establishes the SSL connection.

In a typical configuration, in a cloud or container as a service environment, the web domain may be owned by the cloud provider and only the application sub-domain provided to the customer. The computer infrastructure or server may be accessible to privileged users from the customer account. There may be separate certificate management services that manage the lifecycle of the certificates and distribute the certificates to different target applications.

Current systems and methods for distributing digital certificates and private keys may not provide the level of security and separation of roles desired in some situations to meet certain audit, compliance or regulatory requirements.

SUMMARY

The illustrative embodiments provide a computer-implemented method for distributing digital certificates and private keys. A request for a digital certificate and private key is received from a requesting system. A deployment challenge is sent to a trust agent running on the requesting system. A response to the deployment challenge is received from the trust agent running on the requesting system. The response to the deployment challenge is evaluated to determine whether the response is correct. The digital certificate and private key are distributed to the requesting system in response to a determination that the response to the deployment challenge is correct.

The illustrative embodiments also provide a system for distributing a digital certificate. The system comprises a data processing system configured to: receive a request for the digital certificate from a requesting system, send a deployment challenge to a trust agent running on the requesting system in response to receiving the request for the digital certificate from the requesting system, receive a response to the deployment challenge from the trust agent running on the requesting system, evaluate the response to the deployment challenge received from the trust agent running on the requesting system to determine whether the response is correct, and distribute the digital certificate to the requesting system in response to a determination that the response to the deployment challenge is correct.

The illustrative embodiments also provide a non-transitory computer-readable storage medium storing program code. When executed by a processor, the program code performs a computer-implemented method of distributing a digital certificate, comprising: receiving a request for the digital certificate from a requesting system, sending a deployment challenge to a trust agent running on the requesting system in response to receiving the request for the digital certificate from the requesting system, receiving a response to the deployment challenge from the trust agent running on the requesting system, evaluating the response to the deployment challenge received from the trust agent running on the requesting system to determine whether the response is correct, and distributing the digital certificate to the requesting system in response to a determination that the response to the deployment challenge is correct.

The illustrative embodiments also provide a computer-implemented method of distributing a digital certificate. A request for the digital certificate is sent to a digital certificate and private key distribution system. A deployment challenge is received from the digital certificate and private key distribution system. The deployment challenge received from the digital certificate and private key distribution system is processed to generate a response to the deployment challenge. The response to the deployment challenge is sent to the digital certificate and private key distribution system. The digital certificate and a private key from the digital certificate and private key distribution system is received in response to a determination by the digital certificate and private key distribution system that the response to the deployment challenge is correct.

The illustrative embodiments also provide a system for distributing a digital certificate. The system comprises a data processing system configured to: send a request for the digital certificate to a digital certificate and private key distribution system, receive a deployment challenge from the digital certificate and private key distribution system, process the deployment challenge received from the digital certificate and private key distribution system to generate a response to the deployment challenge, send the response to the deployment challenge to the digital certificate and private key distribution system, and receive the digital certificate and a private key from the digital certificate and private key distribution system in response to a determination by the digital certificate and private key distribution system that the response to the deployment challenge is correct.

Other variations are possible, as described below.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a variety of considerations. For example, the illustrative embodiments recognize and take into account that existing certificate management service implementations may not pay adequate attention to the security implications of sharing digital certificates and private keys. For example, in current configurations, there may be a risk that a privileged user can log into the server or front door running the reverse proxy and access the certificates and private keys from the specified file location without authorization.

Illustrative embodiments provide a system, method, and computer program product for securely distributing digital certificates and private keys required to establish secure HTTPS websites in a cloud or IOT environment in a trusted manner Illustrative embodiments provide a system, method, and computer program product for securely distributing digital certificates and private keys to different targets in a cloud environment, thereby reducing or eliminating the security risks mentioned above.

Figure 1:
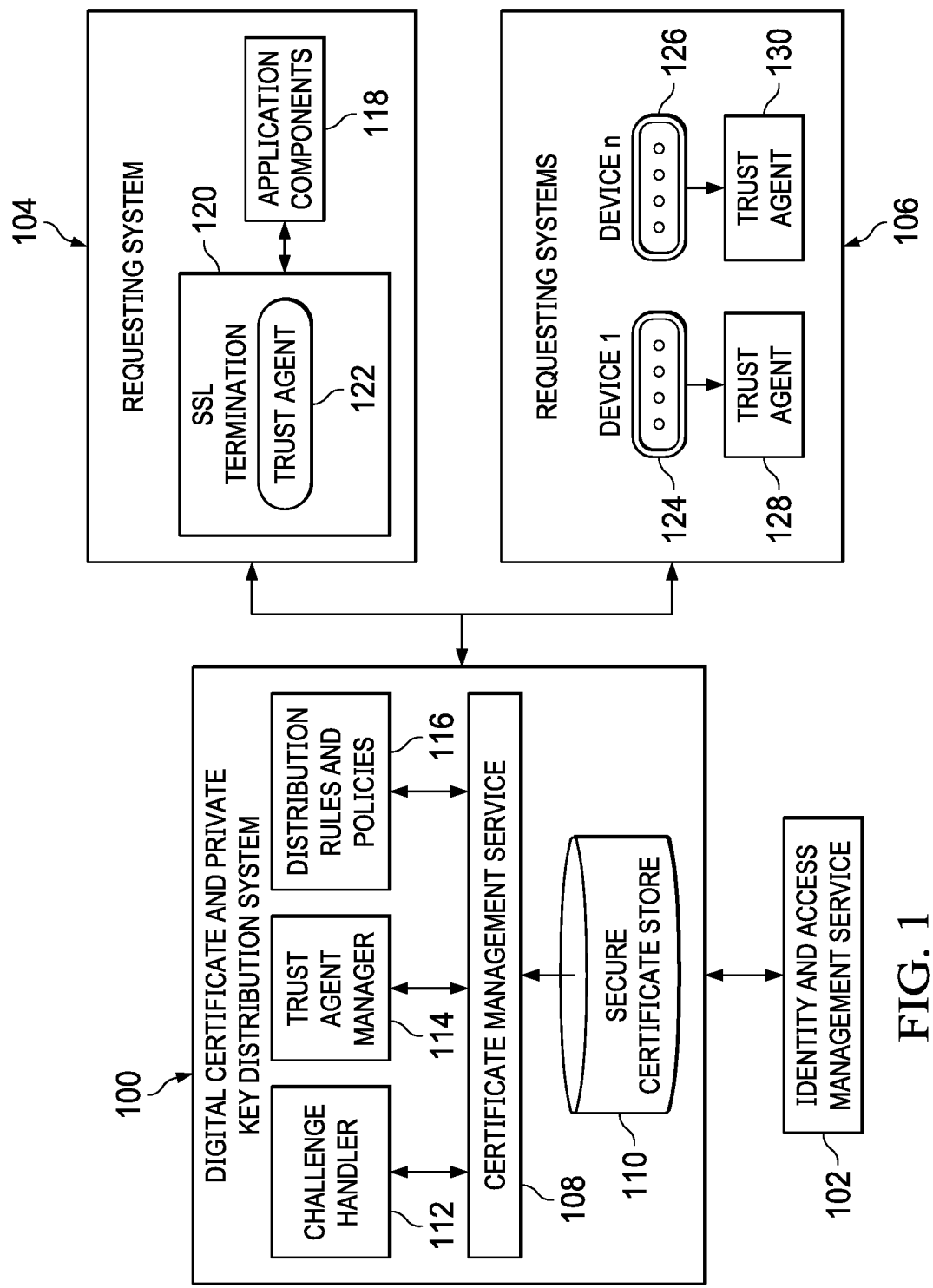
FIG. 1 is a block diagram of a digital certificate and private key distribution system in accordance with an illustrative embodiment.

Turning to FIG. 1, a block diagram of a digital certificate and private key distribution system is depicted in accordance with an illustrative embodiment. Digital certificate and private key distribution system 100 is configured to distribute digital certificates and private keys to a variety of requesting systems and devices. Requesting systems and devices may be authenticated and authorized by identity and access management service 102. For example, without limitation, digital certificate and private key distribution system 100 may be configured to distribute digital certificates and private keys to requesting system 104 comprising SSL termination 120 running application components 118. Alternatively, or in addition, digital certificate and private key distribution system 100 may be configured to distribute digital certificates and private keys to requesting systems 106 including device 124 and device 126 in an internet of things environment.

Digital certificate and private key distribution system 100 may implement certificate management service 108 to distribute digital certificates and private keys to requesting systems 104 and 106 in a secure manner Digital certificates to be distributed by certificate management service 108 may be stored in secure certificate store 110.

Digital certificate and private key distribution system 100 may comprise trust agent manager 114. Trust agent manager 114 may be configured to generate trust agents 122, 128, and 130 for requesting systems 104 and 106 based on distribution rules and policies 116.

Challenge handler 112 may send distribution challenges to trust agents 122, 128, and 130 running on requesting systems 104 and 106 and may evaluate responses from trust agents 122, 128, and 130 to such distribution challenges. Certificate management service 108 may be configured to distribute digital certificates and private keys to requesting systems 104 and 106 only when the response to the distribution challenge is correct.

Figure 2:
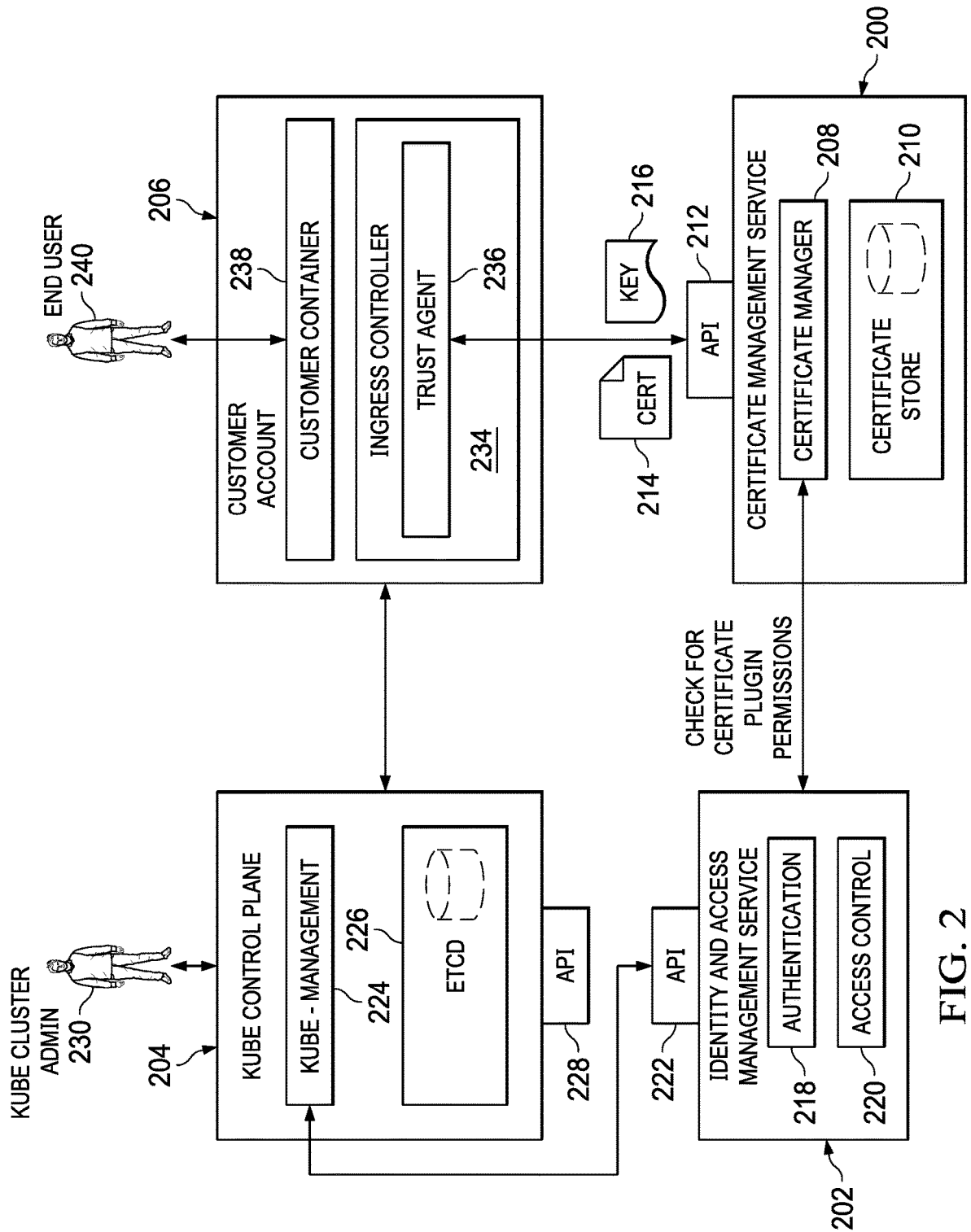
FIG. 2 is a block diagram of an implementation of digital certificate and private key distribution for an application running on a container service in accordance with an illustrative embodiment.

Turning to FIG. 2, a block diagram of an implementation of digital certificate and private key distribution for an application running on a container service is depicted in accordance with an illustrative embodiment. Digital certificate distribution may be implemented using a container service or in any other appropriate manner.

In this example implementation, certificate management service 200 may comprise certificate manager 208 and certificate store 210. Application programming interface 212 is configured to receive digital certificate 214 and key 216 from customer account 206.

Certificate manager 208 may use identity and access management service 202 to check permissions of SSL termination points, like ingress controller 234, requesting certificate 214 and private key 216. Identity and access management service 202 thus may provide authentication 218 and access control 220. Application programming interface 222 may be configured to provide an interface between identity and access management service 202 and kube control plane 204.

Kube control plane 204 may comprises kube management 224, ETCD 226, and application programming interface 228. ETCD 226 is a distributed key value store that provides a reliable way to store data across a cluster of machines. Kube control plane 204 may be administered by kube cluster administrator 230.

Customer account 206 may comprise ingress controller 234 and customer container 238 for end user 240. Trust agent 236 may be provided by certificate management service 200 and may be run on customer account 206 to respond to a distribution challenge from certificate management service 200. Certificate management service 200 may only distribute digital certificate 214 and private key 216 to customer account 206 in response to a determination that the response to the distribution challenge is correct.

Figure 3:
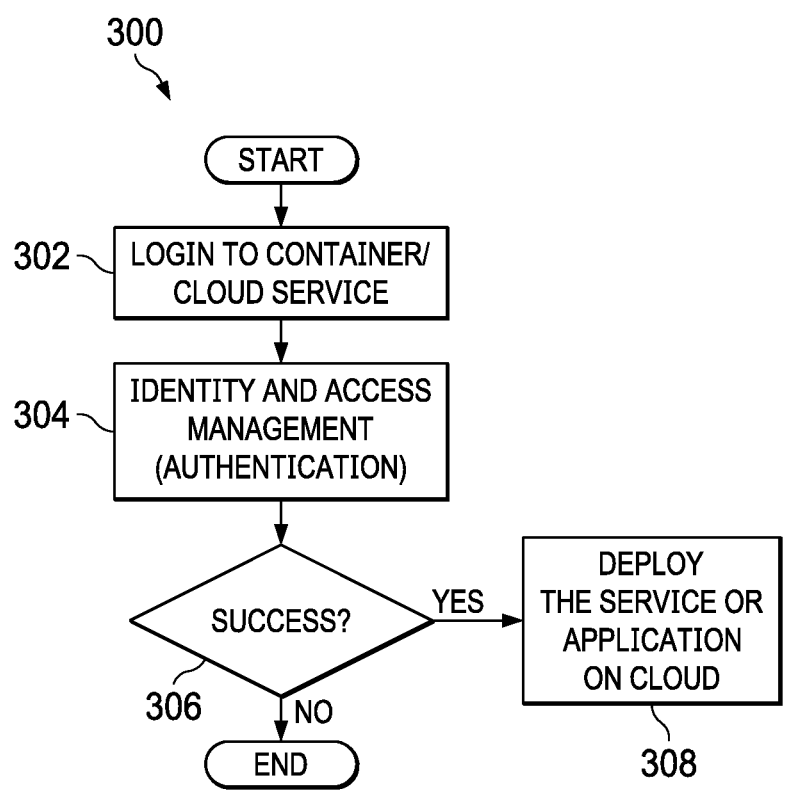
FIG. 3 is an illustration of a flowchart of a process for deploying a service or application in accordance with an illustrative embodiment.

Turning to FIG. 3, an illustration of a flowchart of a process for deploying a service or application is depicted in accordance with an illustrative embodiment. Process 300 is an example of one possible implementation in accordance with illustrative embodiments.

Process 300 may begin with logging in to a container or cloud service (operation 302). Authentication of the login then may be provided by identity and access management (operation 304). It may be determined whether authentication is successful (operation 306). The process may terminate in response to a determination at operation 306 that the authentication is not successful. The service or application may be deployed (operation 308) in response to a determination at operation 306 that the authentication is successful.

Figure 4:
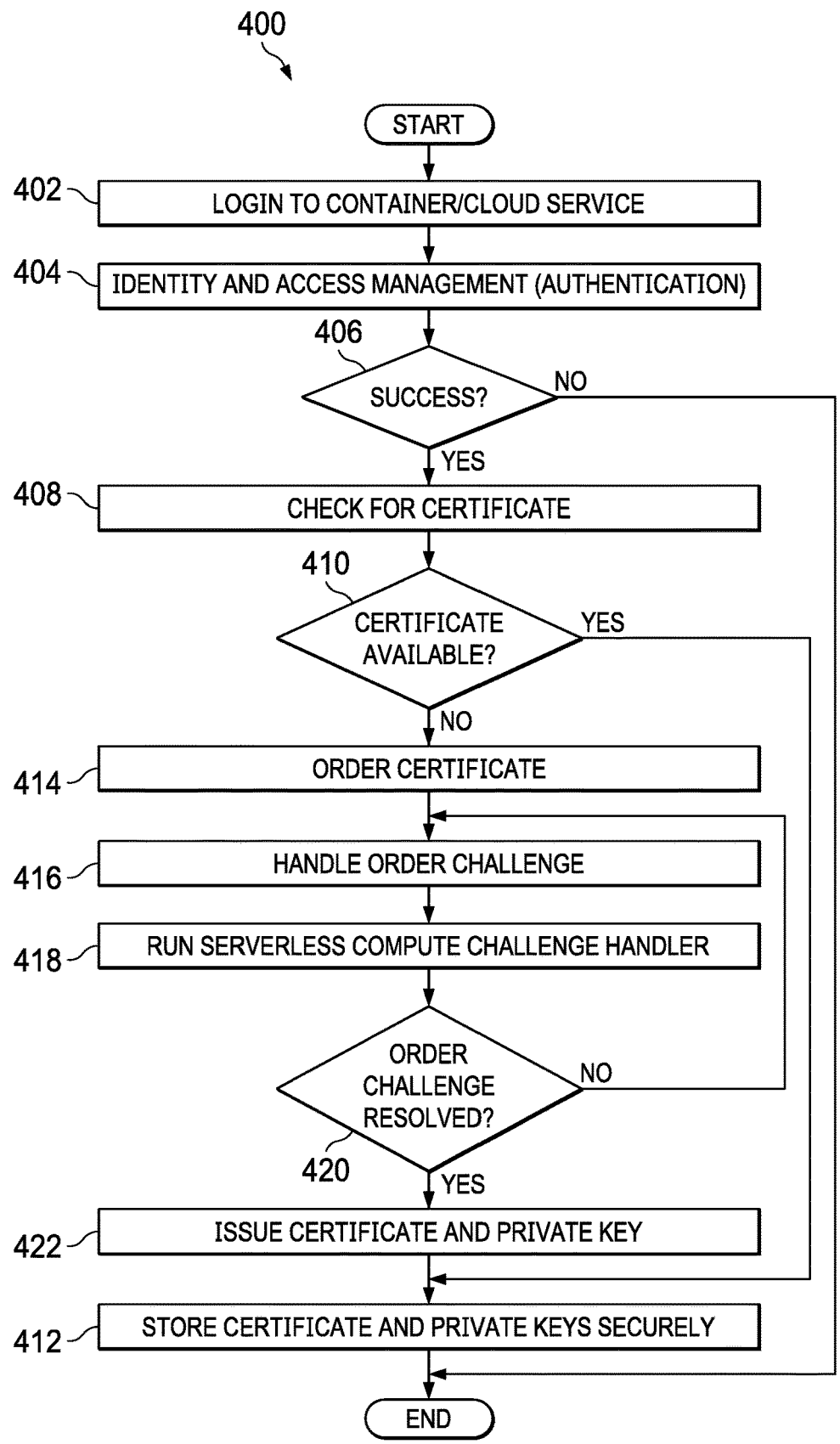
FIG. 4 is an illustration of a flowchart of a process for ordering a digital certificate in accordance with an illustrative embodiment.

Turning to FIG. 4, an illustration of a flowchart of a process for ordering a digital certificate is depicted in accordance with an illustrative embodiment. Process 400 is an example of one possible implementation in accordance with illustrative embodiments.

Process 400 may begin with logging in to a container or cloud service (operation 402). Authentication of the login then may be provided by identity and access management (operation 404). It may be determined whether authentication is successful (operation 406). The process may terminate in response to a determination at operation 406 that the authentication is not successful.

A certificate manager may check for a desired digital certificate (operation 408) in response to a determination at operation 406 that the authentication is successful. It may be determined whether the desired digital certificate is available (operation 410). The digital certificate and corresponding public key may be stored securely (operation 412) in response to a determination at operation 410 that the desired digital certificate is available, with the process terminating thereafter.

The desired digital certificate may be ordered (operation 414) in response to a determination at operation 410 that the desired digital certificate is not available. An order challenge may be handled (operation 416) by running a serverless computer challenge handler (operation 418). It may be determined whether the order challenge is resolved (operation 420). The process may return to operation 416 in response to a determination at operation 420 that the order challenge is not resolved. The digital certificate and corresponding private key may be issued (operation 422) and the digital certificate and corresponding public key stored securely (operation 412) in response to a determination at operation 420 that the order challenge is resolved, with the process terminating thereafter.

Figure 5:
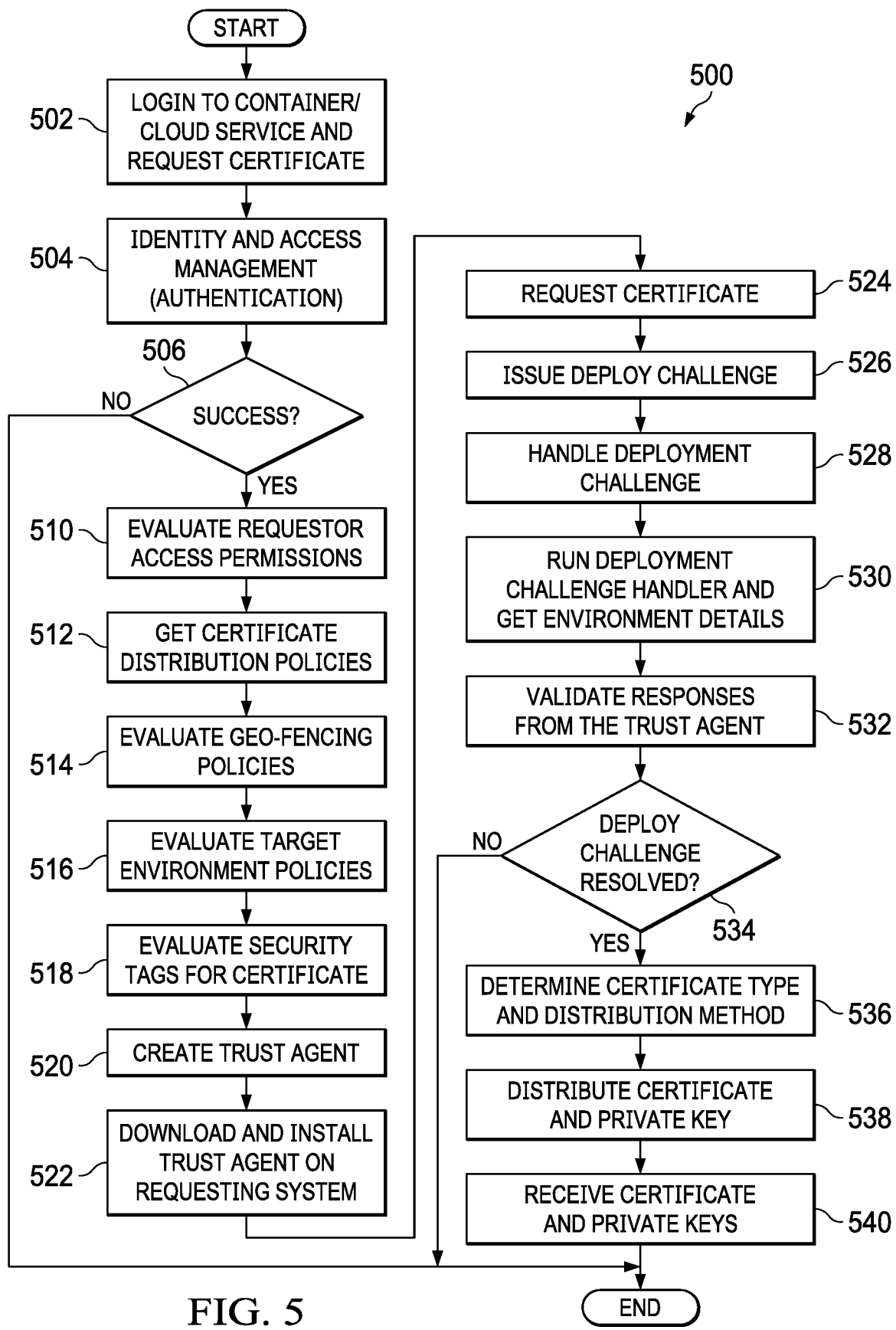
FIG. 5 is an illustration of a flowchart of a process for securely delivering a digital certificate and private key in accordance with an illustrative embodiment.

Turning to FIG. 5, an illustration of a flowchart of a process for securely delivering a digital certificate and private key is depicted in accordance with an illustrative embodiment. Process 500 is an example of one possible implementation in accordance with illustrative embodiments.

Process 500 may begin with logging in to a container or cloud service and requesting a digital certificate (operation 502). Authentication of the login then may be provided by identity and access management (operation 504). It may be determined whether authentication is successful (operation 506). The process may terminate in response to a determination at operation 506 that the authentication is not successful.

A digital certificate and private key distribution system in accordance with an illustrative embodiment may be accessed (operation 508) in response to a determination at operation 506 that the authentication is successful. Requestor access permissions may be evaluated (operation 510) and certificate distribution policies for the requester may be retrieved (operation 512). Geo-fencing policies may be evaluated (operation 514), target environment policies may be evaluated (operation 516), and security tags for the digital certificate may be evaluated (operation 518). Based on the evaluations performed, a trust agent may be generated (operation 520).

The trust agent may be downloaded and installed on the requesting system (operation 522). The digital certificate may be requested (operation 524). A deployment challenge may be issued by the digital certificate and private key distribution system (operation 526). The deployment challenge may be handled by the trust agent running on the requesting system (operation 528). The deployment challenge may be handled by running a deployment challenge handler and obtaining details regarding the operating environment of the requesting system (operation 530). A response to the deployment challenge may be sent from the trust agent back to the digital certificate and private key distribution system for evaluation (operation 532).

It may be determined whether the deployment challenge is resolved (operation 534). The process may terminate without sending a digital certificate to the requesting system in response to a determination at operation 534 that the deployment challenge is not resolved. The appropriate digital certificate type and distribution method may be determined (operation 536) in response to a determination at operation 534 that the deployment challenge is resolved. For example, without limitation, the digital certificate and a private key may be distributed to the requesting system by file delivery or streaming. The digital certificate and private key then may be distributed by the digital certificate and public key distribution system (operation 538) and the digital certificate and private key may be received by the requesting system (operation 540), with the process terminating thereafter.

Figure 6:
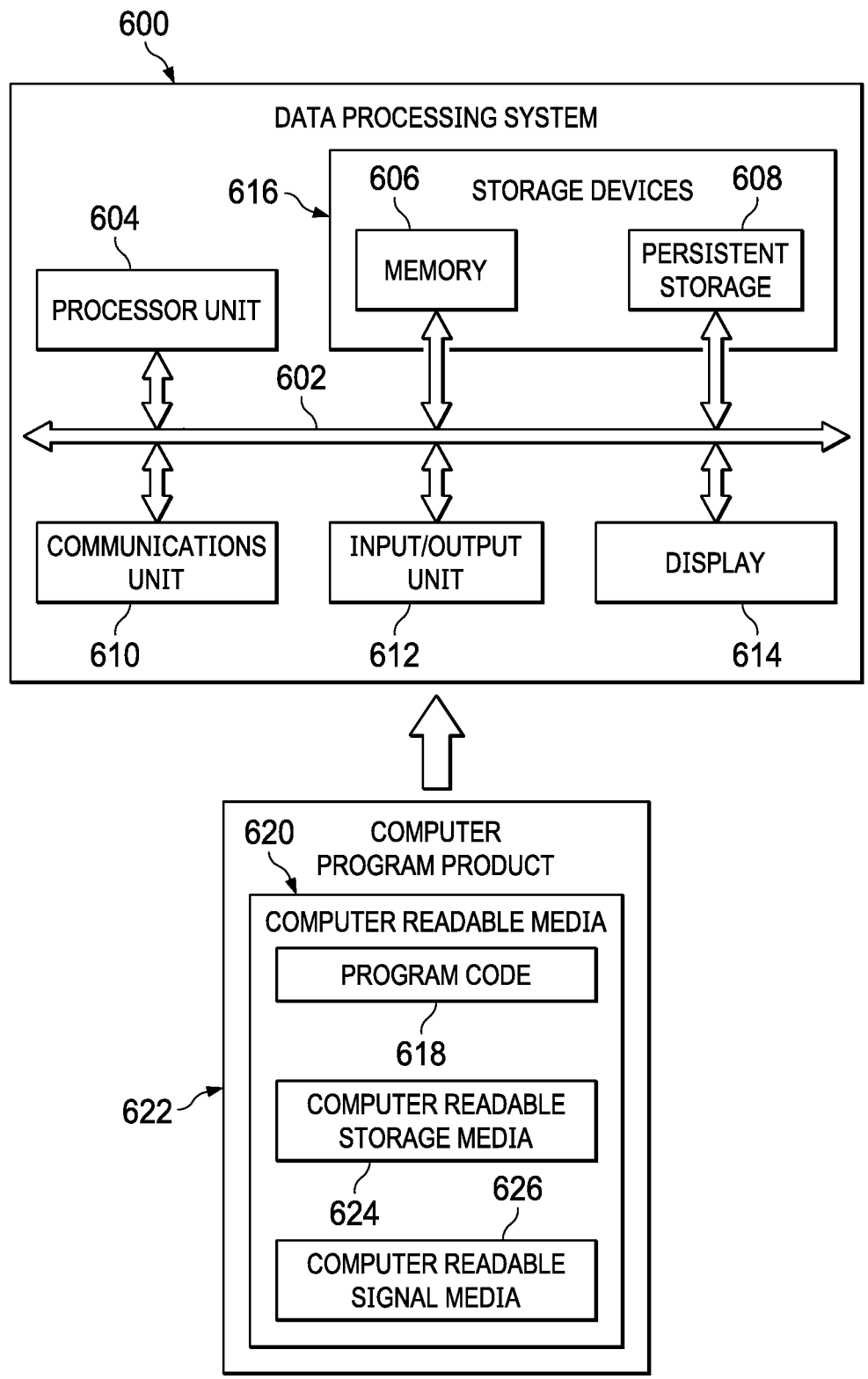
FIG. 6 illustrates a data processing system, in accordance with an illustrative embodiment.

Turning to FIG. 6, a diagram of a data processing system is depicted in accordance with an illustrative embodiment. Data processing system 600 is an example of a system in which computer-readable program code or program instructions implementing processes of illustrative embodiments may be run. For example, data processing system 600 may be an example of one implementation of one or more of digital certificate and private key distributions system 100, requesting system 104, and requesting systems 106 in FIG. 1. In this illustrative example, data processing system 600 includes communications fabric 602, which provides communications between processor unit 604, memory 606, persistent storage 608, communications unit 610, input/output unit 612, and display 614.

Processor unit 604 serves to execute instructions for software applications and programs that may be loaded into memory 606. Processor unit 604 may be a set of one or more hardware processor devices or may be a multi-processor core, depending on the particular implementation. Further, processor unit 604 may be implemented using one or more heterogeneous processor systems, in which a main processor is present with secondary processors on a single chip. As another illustrative example, processor unit 604 may be a symmetric multi-processor system containing multiple processors of the same type.

Memory 606 and persistent storage 608 are examples of storage devices 616. A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 606, in these examples, may be, for example, a random access memory, or any other suitable volatile or non-volatile storage device. Persistent storage 608 may take various forms, depending on the particular implementation. For example, persistent storage 608 may contain one or more devices. For example, persistent storage 608 may be a hard drive, a flash memory, a rewritable optical disk, a rewritable magnetic tape, or some combination of the above. The media used by persistent storage 608 may be removable. For example, a removable hard drive may be used for persistent storage 608.

Communications unit 610, in this example, provides for communication with other computers, data processing systems, and devices via network communications unit 610 may provide communications using both physical and wireless communications links. The physical communications link may utilize, for example, a wire, cable, universal serial bus, or any other physical technology to establish a physical communications link for data processing system 600. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 600.

Input/output unit 612 allows for the input and output of data with other devices that may be connected to data processing system 600. For example, input/output unit 612 may provide a connection for user input through a keypad, keyboard, and/or some other suitable input device. Display 614 provides a mechanism to display information to a user and may include touch screen capabilities to allow the user to make on-screen selections through user interfaces or input data, for example.

Instructions for the operating system, applications, and/or programs may be located in storage devices 616, which are in communication with processor unit 604 through communications fabric 602. In this illustrative example, the instructions are in a functional form on persistent storage 608. These instructions may be loaded into memory 606 for running by processor unit 604. The processes of the different embodiments may be performed by processor unit 604 using computer-implemented program instructions, which may be located in a memory, such as memory 606. These program instructions are referred to as program code, computer-usable program code, or computer-readable program code that may be read and run by a processor in processor unit 604. The program code, in the different embodiments, may be embodied on different physical computer-readable storage devices, such as memory 606 or persistent storage 608.

Program code 618 is located in a functional form on computer-readable media 620 that is selectively removable and may be loaded onto or transferred to data processing system 600 for running by processor unit 604. Program code 618 and computer-readable media 620 form computer program product 622. In one example, computer-readable media 620 may be computer-readable storage media 624 or computer-readable signal media 626. Computer-readable storage media 624 may include, for example, an optical or magnetic disc that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory that is connected to data processing system 600. In some instances, computer-readable storage media 624 may not be removable from data processing system 600.

Alternatively, program code 618 may be transferred to data processing system 600 using computer-readable signal media 626. Computer-readable signal media 626 may be, for example, a propagated data signal containing program code 618. For example, computer-readable signal media 626 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 618 may be downloaded over a network to persistent storage 608 from another device or data processing system through computer-readable signal media 626 for use within data processing system 600. For instance, program code stored in a computer-readable storage media in a data processing system may be downloaded over a network from the data processing system to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to, or in place of, those illustrated for data processing system 600. Other components shown in FIG. 6 can be varied from the illustrative examples shown. The different embodiments may be implemented using any hardware device or system capable of executing program code. As one example, data processing system 600 may include organic components integrated with inorganic components and/or may be comprised entirely of organic components excluding a human being. For example, a storage device may be comprised of an organic semiconductor.

As another example, a computer-readable storage device in data processing system 600 is any hardware apparatus that may store data. Memory 606, persistent storage 608, and computer-readable storage media 624 are examples of physical storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache such as found in an interface and memory controller hub that may be present in communications fabric 602.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:
1. A certificate and key distribution computer for distributing a digital certificate, the certificate and key distribution computer comprising:
a bus system;

a storage device connected to the bus system, wherein the storage device stores program instructions; and a processor connected to the bus system, wherein the processor executes the program instructions to:
receive a request for the digital certificate from a requesting data processing system;
retrieve certificate distribution policies corresponding to the requesting data processing system;
generate a trust agent that is to be installed in a secure sockets layer termination point separate from application components on the requesting data processing system based on evaluating the certificate distribution policies corresponding to the requesting data processing system and checking permissions on the secure sockets layer termination point;
install the trust agent in the secure sockets layer termination point separate from the application components on the requesting data processing system;
send a deployment challenge to the trust agent running on the requesting data processing system in response to receiving the request for the digital certificate from the requesting data processing system;
receive a response to the deployment challenge from the trust agent running on the requesting data processing system;
evaluate the response to the deployment challenge received from the trust agent running on the requesting data processing system to determine whether the response is correct; and
distribute the digital certificate to the requesting data processing system in response to a determination that the response to the deployment challenge is correct.

2. The certificate and key distribution computer of claim 1, wherein the certificate distribution policies comprise
operating environment details corresponding to the requesting data processing system.

3. The certificate and key distribution computer of claim 1, wherein the certificate and key distribution computer distributes the digital certificate to the requesting data processing system by streaming the digital certificate to the requesting data processing system.

4. The certificate and key distribution computer of claim 1, wherein the processor further executes the program instructions to:
distribute a private key corresponding to the digital certificate to the requesting data processing system in response to a determination that the response to the deployment challenge is correct.

5. A computer program product for distributing a digital certificate, the computer program product comprising a computer readable storage medium having program instructions embodied therewith, the program instructions executable by a certificate and key distribution computer to cause the certificate and key distribution computer to perform a method comprising:
receiving, by the certificate and key distribution computer, a request for the digital certificate from a requesting data processing system;
retrieving, by the certificate and key distribution computer, certificate distribution policies corresponding to the requesting data processing system;
generating, by the certificate and key distribution computer, a trust agent that is to be installed in a secure sockets layer termination point separate from application components on the requesting data processing system based on evaluating the certificate distribution policies corresponding to the requesting data processing system and checking permissions on the secure sockets layer termination point;
installing, by the certificate and key distribution computer, the trust agent in the secure sockets layer termination point separate from the application components on the requesting data processing system;
sending, by the certificate and key distribution computer, a deployment challenge to the trust agent running on the requesting data processing system in response to the certificate and key distribution computer receiving the request for the digital certificate from the requesting data processing system;
receiving, by the certificate and key distribution computer, a response to the deployment challenge from the trust agent running on the requesting data processing system;
evaluating, by the certificate and key distribution computer, the response to the deployment challenge received from the trust agent running on the requesting data processing system to determine whether the response is correct; and
distributing, by the certificate and key distribution computer, the digital certificate to the requesting data processing system in response to a determination that the response to the deployment challenge is correct.

6. The computer program product of claim 5, wherein the certificate distribution policies comprise
operating environment details corresponding to the requesting data processing system.

7. The computer program product of claim 5 further comprising:
distributing, by the certificate and key distribution computer, the digital certificate to the requesting data processing system by streaming the digital certificate to the requesting data processing system.

8. The computer program product of claim 5 further comprising:
distributing, by the certificate and key distribution computer, a private key corresponding to the digital certificate to the requesting data processing system in response to a determination that the response to the deployment challenge is correct.

9. A requesting data processing system for distributing a digital certificate, the requesting data processing system comprising:
a bus system;
a storage device connected to the bus system, wherein the storage device stores program instructions; and
a processor connected to the bus system, wherein the processor executes the program instructions to:
send a request for the digital certificate to a certificate and key distribution computer;
receive an installation of a trust agent that was generated by the certificate and key distribution computer based on certificate distribution policies corresponding to the data processing system within a secure sockets layer termination point separate from application components on the requesting data processing system and permissions on the secure sockets layer termination point;
receive a deployment challenge from the certificate and key distribution computer using the trust agent installed within the secure sockets layer termination point separate from the application components on the requesting data processing system;
run the trust agent installed within the secure sockets layer termination point separate from the application components on the requesting data processing system to process the deployment challenge received from the certificate and key distribution computer to generate a response to the deployment challenge;

send the response to the deployment challenge to the certificate and key distribution computer; and receive the digital certificate and a private key from the certificate and key distribution computer in response to a determination by the certificate and key distribution computer that the response to the deployment challenge is correct.

10. The requesting data processing system of claim 9, wherein the requesting data processing system receives the digital certificate by streaming of the digital certificate from the certificate and key distribution computer.

* * * * *